J. HINSON.
JOURNAL BOX COOLER.
APPLICATION FILED OCT. 19, 1920.
1,421,473.
Patented July 4, 1922.
2 SHEETS—SHEET 1.
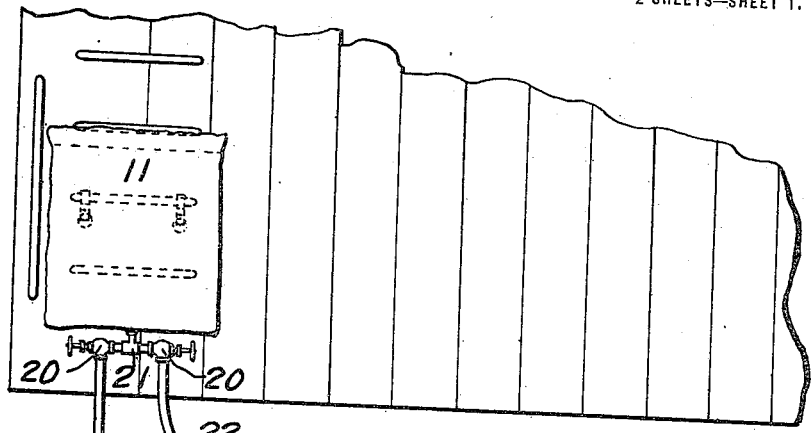
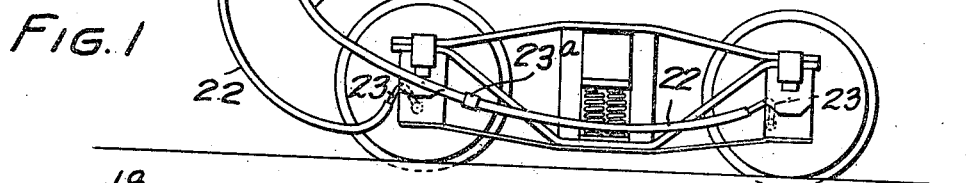
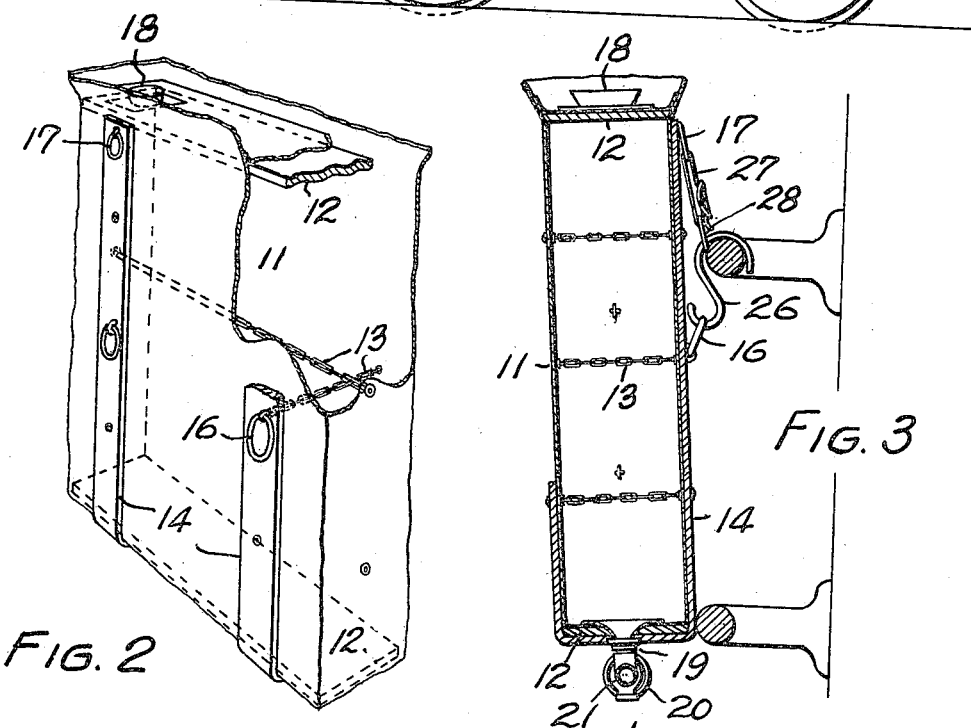
Inventor
John Hinson

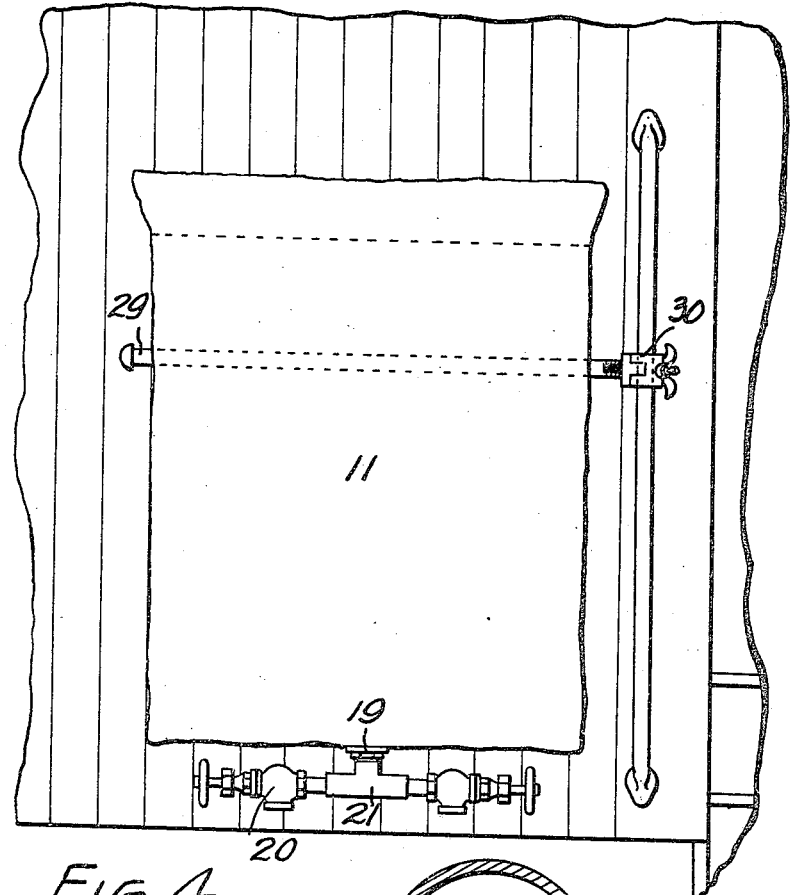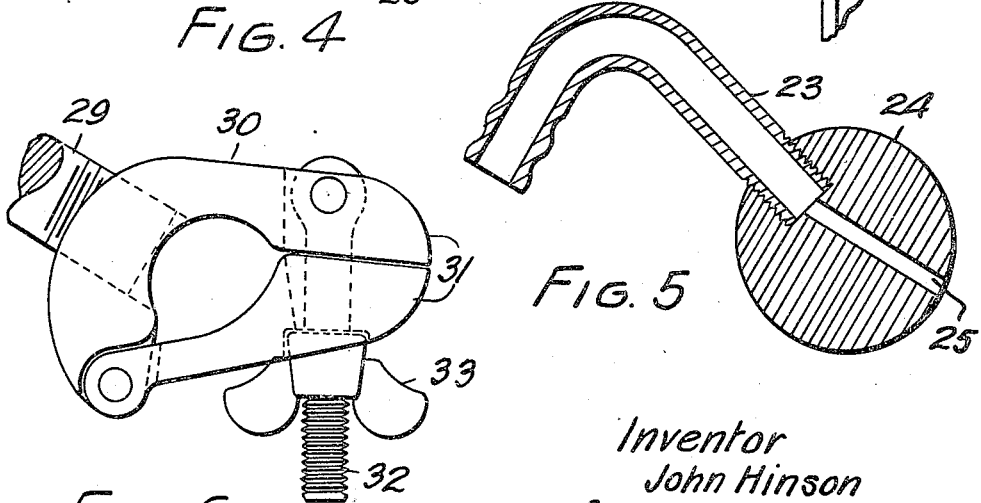

UNITED STATES PATENT OFFICE.

JOHN HINSON, OF MONTREAL, QUEBEC, CANADA.

JOURNAL-BOX COOLER.

1,421,473. Specification of Letters Patent. Patented July 4, 1922.

Application filed October 19, 1920. Serial No. 418,021.

*To all whom it may concern:*

Be it known that I, JOHN HINSON, a subject of the King of Great Britain, and resident of the city of Montreal, in the Province of Quebec and Dominion of Canada, have invented certain new and useful Improvements in Journal-Box Coolers, of which the following is a full, clear, and exact description.

This invention relates to improvements in cooling means for the journal boxes of railway cars, and the object of the invention is to provide a simple, durable and efficient cooling device which may be stored in small space in the van or baggage car of a train when not in use and which may be quickly and easily attached to any type of car.

The device consists briefly of a reservoir of canvas or other suitable flexible material provided in the upper part with means for attaching it to any suitable part of a car and provided at the bottom with a valved outlet, to which one or more flexible pipes may be connected to convey water from the reservoir to the hot journal box. The pipe is preferably made up in sections of suitable length coupled together, so that only the necessary number of sections need be used to reach from the reservoir to a heated journal.

In the drawings which illustrate the invention:—

Fig. 1 is a fragmentary side elevation of a box car showing the invention in position thereon.

Fig. 2 is a perspective view of the reservoir partly in section showing the construction thereof.

Fig. 3 is a vertical sectional view of the reservoir illustrating one method of attaching same to a car.

Fig. 4 is an elevation showing the method of attaching the reservoir to a passenger car.

Fig. 5 is a sectional view of the nozzle.

Fig. 6 is a plan view of a clamp used in attaching the reservoir.

Referring more particularly to the drawings, 11 designates a reservoir of any suitable material such as heavy waterproofed canvas. This reservoir is preferably made up in the form of a deep, flat, rectangular sack which will hang against the side of a car and not project more than a few inches therefrom. The sack is kept approximately in shape by rectangular sheets 12 of leather or other suitable material inserted in the top and bottom. Stays 13 are provided as necessary within the reservoir to hold the same against bulging in a globular form. The sack may be strengthened by external reinforcing bands 14 of leather or other flexible material, which will also provide convenient anchorage for the ends of the stays. These reinforcing members 14 preferably extend from the top down one side of the reservoir under the bottom and a short distance up the opposite side, but it will be understood that the invention is not limited to this particular disposition, the reason for which is that it facilitates rolling of the reservoir into small space when not in use. In order to permit the rolling or folding of the reservoir, the stays 13 are preferably light chains. On that side of the reservoir on which the reinforcing extends the full distance from top to bottom, a plurality of rings 16 and 17 are provided, the rings 16 being conveniently attached to the ends of transverse stays, so that the weight of the reservoir when suspended by the rings will be distributed between both sides thereof and tendency to bulging will be avoided. At the top of the reservoir, a filling aperture 18 is provided which may if desired be provided with any suitable form of strainer. At the bottom, preferably in the centre, an outlet 19 is provided to which one or more valves 20 are connected. In the case of two or more valves, the same are connected to a T 21, which is in turn releasably connected to the outlet. A suitable number of lengths 22 of flexible pipe, such as rubber hose, are provided for each reservoir, the lengths being provided with couplings 23ª so that they may be connected together to form a longer pipe. One or more of the lengths is provided with a gooseneck 23 on one end of which a heavy, substantially spherical tip 24 is attached. The tip is provided with a bore 25 communicating with the bore of a goose-neck and extending at any suitable angle with respect to the gooseneck.

The reservoir may be attached to the car in a variety of ways. For example, in order to attach the device to a box car, a pair of S hooks 26 are provided adapted to engage the rings 16 on the reservoir and also to engage one of the steps of the usual ladder found on the side of a box car. In order to prevent the upper part of the reservoir from falling outwardly when empty, a check strap 27 may be connected between the upper rings 17 of the reservoir and rings 28 running on the hooks 26. This method of attachment will serve also for gondola cars. When dealing with a flat car, the reservoir may be attached in a variety of ways, probably the simplest of which will be to buckle the check straps 27 through suitably selected rings on the reservoir and through a side stake pocket if the car is empty or around the stake itself if the car is loaded. When dealing with passenger cars, a special bracket 29 is provided to support the reservoir. This bracket is equipped at one end with a clamp 30 adapted for attachment to the hand rail at the car steps. The clamp comprises a pair of pivoted jaws 31 and a clamping bolt 32 pivoted to one of the jaws and swinging into engagement with the other jaw and provided with a wing nut 33, so that it may be applied by hand and without the use of any tools. The bracket bar 29 may be screwed into one of the jaw members, so that if the clamp is loose on the hand rail, the bar 29 may be screwed against the hand rail to tighten the grip. The bracket may be thrust through the rings on the reservoir or may be thrust between the reservoir and the upper ends of the reinforcing straps 15.

When the device is not in use, it is of course emptied and may be rolled up into very small space, the reinforcing straps 14 being on the outside of the roll. It will not be necessary to disconnect the valves from the reservoir but this may be done if desired as the reservoir will roll up more compactly if the valves are removed. When the device is to be applied, it is simply unrolled, filled with water and attached to a car as previously described. A suitable number of hose lengths are connected together to extend from one or both of the valves to the journal box or boxes, which are hot, and the valves opened. The flow of water may be regulated by the valves but this is not essential as the bore of the tip 24 is of small size and will ensure a small flow of water through a considerable period of time. The journal box is opened and the goose-neck hooked into same, the cover being then closed upon the goose-neck. The spring of the box cover will hold the goose-neck against escape as the large tip 24 will not readily draw out of the box. The accumulation of water in the box will not only cool the journal but will also float a large amount of oil into contact with the journal, so that the same will be cooled and flushed with lubricating oil. A comparatively small reservoir will hold from fifteen to twenty gallons of water and will supply water to one journal box for two to three hours, depending upon the size of bore in the tip 24. Two journal boxes will obviously be supplied for half the length of time. This will be ample to allow a train to reach some point at which the car may be set off for repairs. If it should happen that journals are heating on both sides of a car or that the journal is heating on that side and end of the car where there is no ladder, the reservoir may be mounted on one side of the car and a suitable number of hose lengths connected together to reach under the car to a journal box on the opposite side. If the journals are heating at both ends of a car, it will obviously be necessary to use two reservoirs, and it will therefore be advisable that the equipment of a train include two or more reservoirs with a sufficient number of lengths of hose for each.

The chief advantage of the device is that the whole equipment is capable of being stored in small space when not in use and will not be readily damaged as would a metal reservoir which would become punctured or corroded, whereas the waterproof qualities of good canvas improve with age. The whole equipment is light, simple and easily applied to a car. The amount of water required is not very great and can be obtained from a ditch or from the locomotive tender. In any case, the reservoir is of such construction that it may be readily carried by one man even when full.

Having thus described my invention, what I claim is;—

1. A device of the class described comprising a reservoir, means for attaching same to a car, a water conduit leading from the reservoir and a goose-neck at the outlet end of the conduit adapted to hook into a journal box, said goose-neck having a large tip to resist withdrawal from the journal box.

2. A device of the class described comprising a flexible and collapsible reservoir provided with flexible internal stays to hold the same against bulging when full, means for attaching the reservoir to a car and a water conduit leading from the reservoir adapted for connection to a car journal box.

3. A device of the class described, comprising a reservoir, attaching means for the reservoir including rings on the reservoir, S hooks adapted for engagement with said rings and with a car, and check straps connectable between the S hooks and rings of the reservoir to hold the same against outward displacement when empty, and a water conduit leading from the reservoir and adapted for connection to a journal box.

4. In a device of the class described, a reservoir comprising a flat rectangular sack of flexible waterproof material, shape giving stiffening members at the top and bottom of said sack, and flexible stay chains disposed within the sack and arranged to hold the same against bulging when full.

5. In combination with a device according to claim 4, externally disposed reinforcing straps passing from the top of the reservoir under the bottom thereof, and attaching means connected to said straps and to certain of the stays.

6. A device of the class described comprising a reservoir, means for attaching same to a car, a flexible water conduit leading from the reservoir and a rigid gooseneck at the outlet end of the conduit adapted to hook in a journal box, said goose-neck providing a discharge nozzle for the conduit.

In witness whereof, I have hereunto set my hand.

JOHN HINSON.